United States Patent [19]
Cho et al.

[11] Patent Number: 5,105,296
[45] Date of Patent: Apr. 14, 1992

[54] METHOD AND APPARATUS FOR DETECTING BEAM SPOT SHAPE

[75] Inventors: Masamichi Cho; Yasuo Kurusu; Kunio Tomohisa, all of Kyoto, Japan

[73] Assignee: Dainippon Screen Mfg. Co., Ltd., Kyoto, Japan

[21] Appl. No.: 607,416

[22] Filed: Oct. 31, 1990

[30] Foreign Application Priority Data

Nov. 20, 1989 [JP] Japan .................................. 1-301098
Jan. 29, 1990 [JP] Japan .................................. 2-19674

[51] Int. Cl.[5] ............................................ G02B 26/08
[52] U.S. Cl. ................................... 359/196; 359/216; 250/237 G; 356/374; 346/108
[58] Field of Search ................... 350/6.1, 6.5, 6.7, 6.8, 350/271; 250/235, 236, 237 G, 349, 358.1; 356/47, 151, 376, 387, 238, 430, 374

[56] References Cited
U.S. PATENT DOCUMENTS 4,465,373 8/1984 Tamaki et al. .................. 250/237 G
4,961,080 10/1990 Henderson et al. ................. 346/108

FOREIGN PATENT DOCUMENTS 13514 1/1989 Japan .

Primary Examiner—Loha Ben
Attorney, Agent, or Firm—Lowe, Price, LeBlanc & Becker

[57] ABSTRACT

A method and apparatus for detecting the shape of a beam spot on a scanning plane in a scanning optical system having a constant scanning speed. When a relative moving speed of the light beam is not known beforehand, four slits are used to detect intensities of light passing through the slits. Three of these slits have different angles of inclination with respect to a scanning direction, and the remaining slit has the same angle of inclination as one of the three slits. When the moving speed of the light beam is known in advance, the first-mentioned three slits are used. The moving speed of the light beam is derived from a time lapse between signals detected through the two slits having the same angle of inclination. Once the moving speed of the light beam is known, periods of movement required for the light beam to traverse the three slits having different angles of rotation are obtained on the basis of detection signals relating to these slits. Then, distances of movement required for the light beam to traverse the three slits are derived from the periods and scanning speed, respectively. The three distances of movement thus obtained are used in determining the beam spot shape. Where knife edges are used instead of the slits, the above operation is carried out after differentiating signals detected through the knife edges.

20 Claims, 10 Drawing Sheets

METHOD AND APPARATUS FOR DETECTING BEAM SPOT SHAPE

BACKGROUND OF THE INVENTION (1) Field of the Invention

The present invention relates to a scanning optical system, such as a color or monochrome scanner, a laser printer, or a laser plotter, which causes a light beam to optically scan an original placed on a scanning plane for reading image information from the original or recording a required pattern on a photosensitive material on the scanning plane. More particularly, the invention relates to a method and apparatus for detecting the shape of a beam spot on the scanning plane.

(2) Description of the Related Art

It is known that, with this type of scanning optical system, a deviation from a target value of the shape of a beam spot on the scanning plane due to an error in its optics or the like results in blurred edges of a recorded pattern or in scanning line separation (i.e. formation of a gap between adjacent scanning lines). To cope with such a situation, the following methods have been proposed and employed for detecting the shape of a beam spot on the scanning plane.

Figure 1:
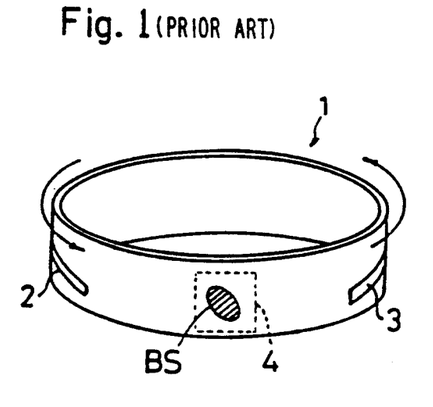
FIG. 1 is a perspective view illustrating a conventional method.

One of these methods is described with reference to FIG. 1. A drum 1 rotatable at a constant speed has a peripheral wall defining two slits 2 and 3 inclined 45 degrees in opposite directions with respect to a direction of rotation. A light beam is projected from outside to the drum 1 at right angles to the peripheral wall. A light sensor 4 is mounted inside the drum 1 to be opposed to a beam spot BS formed on a peripheral surface of the drum 1.

Figure 2A:
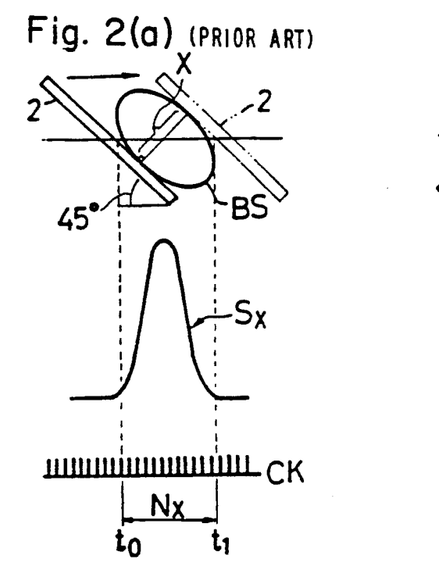
FIGS. 2(a) and 2(b) are explanatory views illustrating functions of the conventional method.
Figure 2B:
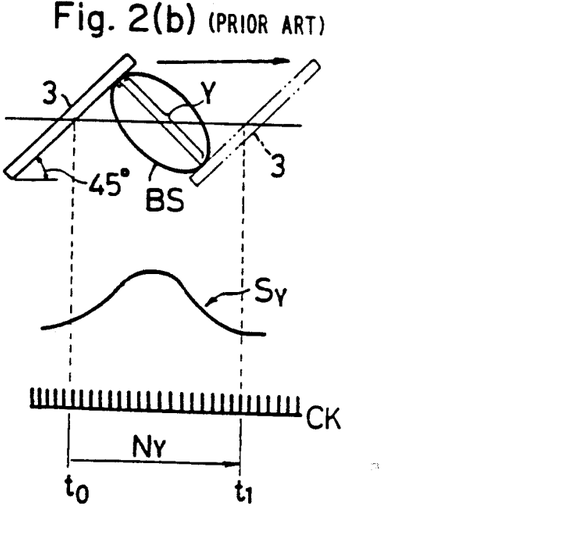

As shown in FIG. 2(a), when the first slit 2 traverses the elliptic beam spot BS, the light sensor 4 outputs a detection signal as referenced Sx. The time required for the first slit 2 to traverse the beam spot BS is obtained by counting clock pulses CK over a period (t1−t0) during which the detection signal Sx exceeds a predetermined level. Assuming that the count is Nx, the span of the beam spot BS in the direction X (in the direction perpendicular to the first slit 2) is derived from Nx by sin 45°. Similarly, as shown in FIG. 2(b), the span of the beam spot BS in the direction Y (in the direction perpendicular to the second slit 3) is derived from Ny by sin 45°.

A second method is described in Japanese Patent Laying-Open Publication No. 64-13514, for example. According to this method, slits are provided at positions equivalent in optical distance to a scanning plane, and the light beam is projected to traverse these slits. The shape of a beam spot BS is determined by detecting light passing through the slits. More particularly, this method uses a first slit inclined with respect to a scanning direction of the light beam, and a second slit extending perpendicular to the scanning direction, the time required for the beam spot to traverse each slit being measured to obtain beam spot diameters in directions perpendicular to the respective slits.

A third method directly measures a beam spot size from an enlarged image of the beam spot formed on a two-dimensional image pickup device such as a CCD.

Figure 3:
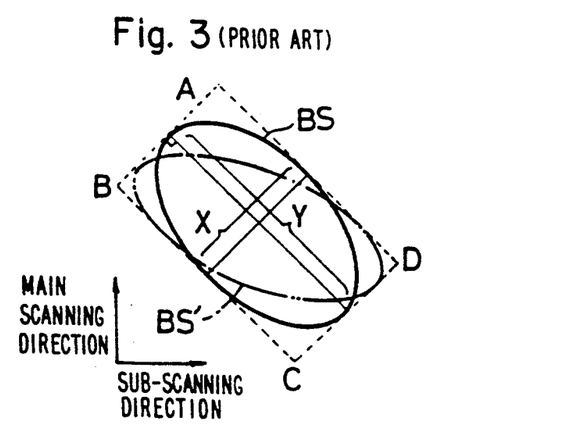
FIGS. 3, 4(a) and 4(b) are views illustrating a drawback of the conventional method.

However, the known methods described above have the following disadvantages:

The first and second methods using two slits to determine the beam spot size, in short, obtain a parallelogram ABCD having the same inclination as the first and second slits and circumscribing the beam spot BS as shown in FIG. 3, and derive the shape of the beam spot BS from distances X and Y between the opposed pairs of sides. The sides BC and AD are parallel lines determined by the first slit 2 shown in FIG. 2(a), for example, whereas the sides AB and DC are parallel lines determined by the second slit 3 shown in FIG. 2(b).

Figure 4A:
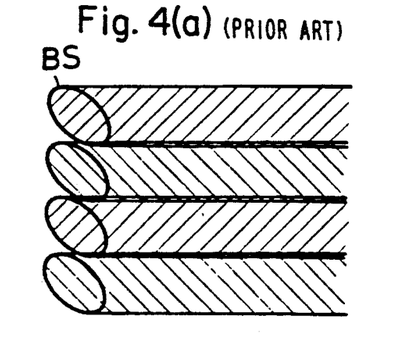
Figure 4B:
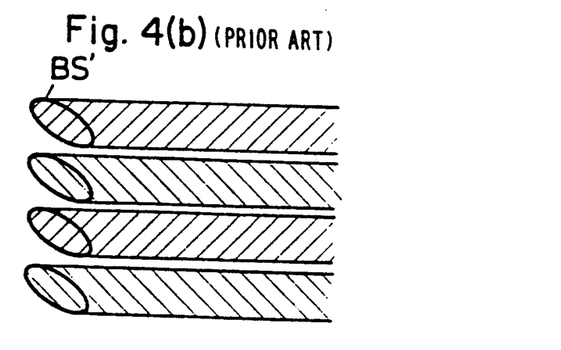

The beam spot on the scanning plane normally has an elliptic shape, and there are an infinite number of elliptic shapes, instead of being just one, that inscribe the parallelogram ABCD. As shown in a two-dot-and-dash line in FIG. 3, for example, a beam spot BS' also inscribes the parallelogram ABCD. In other words, the first and second methods are liable to an error of detecting the beam spots BS and BS' of different shapes as having the same shape. It is thus impossible to correctly recognize elliptic shapes of beam spots. The beam spots BS and BS' in FIG. 3 have different widths in the secondary scanning direction. Although, as shown in FIG. 4(a), proper scanning and recording results may be secured with the light beam BS, the beam spot BS' could produce gaps between adjacent scanning lines as shown in FIG. 4(b).

The third method enables correct recognition of elliptic shapes, but has the drawbacks of involving irksome adjustment of the optics for projecting an enlarged image of the beam spot and of requiring a large and complicated apparatus. In addition, the influences of blooming and crosstalk must be taken into account.

SUMMARY OF THE INVENTION

The present invention has been made having regard to the state of the art noted above, and its object is to provide a method and apparatus for detecting the shape of a beam spot correctly and easily.

The above object is fulfilled by the following aspects of the present invention:

According to a first aspect of the present invention, a method of detecting a beam spot shape on a scanning plane of a scanning light beam in a scanning optical system having a constant scanning speed, comprises the following steps when the scanning speed is known in advance:

(a) Preparing three slits surrounded by a light shielding region on the scanning plane. These slits have different angles of inclination with respect to a scanning direction.

(b) Scanning the three slits with the scanning light beam to obtain light intensity data of the scanning light beam passing through the slits. The light intensity data represent light intensity values sampled at predetermined intervals.

(c) Obtaining, from the light intensity data, a period of movement required for the scanning light beam to traverse the respective slits.

(d) Obtaining, from the scanning speed and the period of movement, a distance of movement required for the scanning light beam to traverse the respective slits.

(e) Obtaining the beam spot shape from the angles of inclination of the respective slits and the distance of movement.

When the scanning speed of the light beam is not known in advance, the following steps are added to determine the scanning speed:

(f) Preparing a first and a second reference slits on the scanning plane, the first and second reference slits having substantially the same angle of inclination with respect to the scanning direction and having a predetermined space therebetween. The first reference slit may act also as one of the three slits mentioned above.

(g) Scanning the first and second reference slits with the scanning light beam to obtain auxiliary light intensity data of the scanning light beam passing through the reference slits. The auxiliary light intensity data represent light intensity values sampled at predetermined intervals.

(h) Obtaining the scanning speed from the auxiliary light intensity data and the space between the reference slits.

The present invention obtains distances of relative movement required for the light beam to traverse the three slits. Once such distances of movement are known, a hexagon circumscribing the beam spot and having parallel opposite sides is determined. There is only one ellipse that inscribes this hexagon. Thus, the shape of the beam spot, more specifically the long diameter and short diameter of the elliptic beam spot and the inclination angle of the longitudinal axis of the beam spot, are unequivocally determined on the basis of the three distances of movement.

In a further aspect of the invention, the slits used in the above method may be replaced by knife edges linearly defined by a region for shielding the light beam and a region for transmitting the light beam. In this case, the beam spot shape may be detected through steps similar to the steps in the foregoing method, after differentiating light intensity data of the scanning light beam having passed the knife edges.

Particularly where the knife edges are used for detecting the beam spot shape, it is unnecessary to correct measurement errors due to a slit width which may occur with use of the slits. Moreover, variations in the light intensity detected by means of the knife edges are greater than those detected through the slits, and hence less vulnerable to noise to assure a highly reliable shape detection.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

DESCRIPTION OF THE PREFERRED EMBODIMENTS

Preferred embodiments of the present invention will be described in detail hereinafter with reference to the drawings.

First Embodiment

Figure 5:
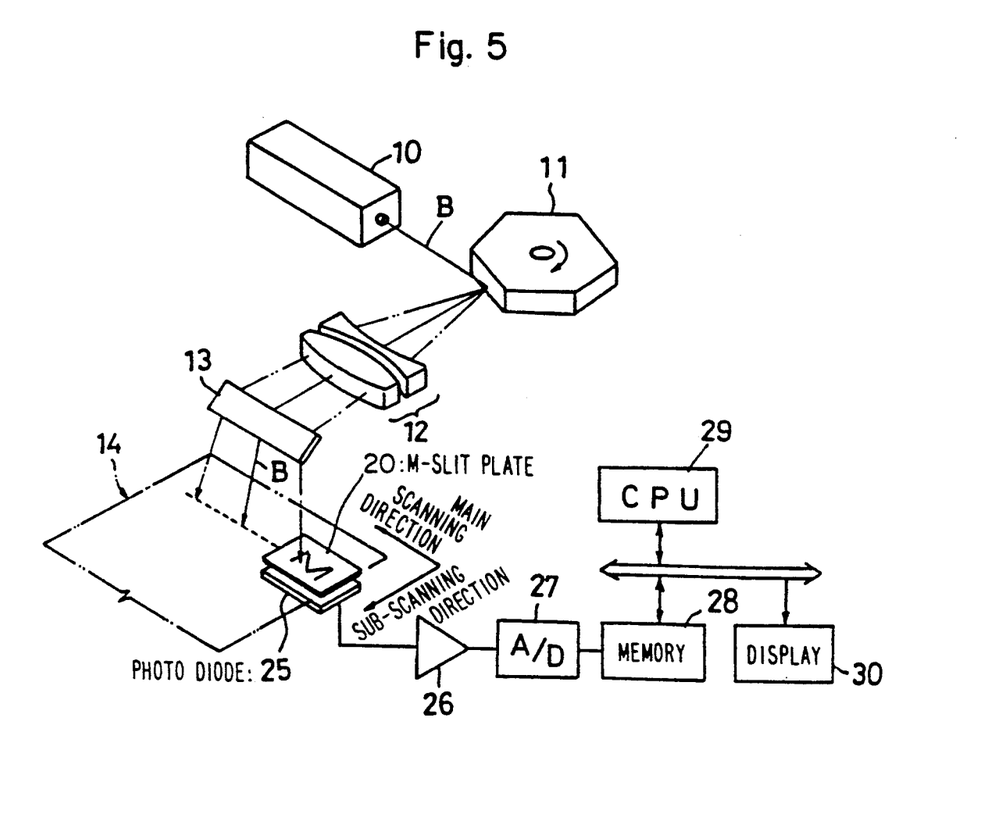
FIG. 5 is a block diagram illustrating an outline of a first embodiment of the present invention.

FIG. 5 is a schematic block diagram illustrating a method according to the present invention as applied to detection of a beam spot shape with a flat-bed scanning optical system. It should be noted, however, that the invention is not limited to a flat-bed scanning optical system, but may be applied also to a rotary scanning optical system whether the apparatus is operable as a recording system or a reading system.

The flat-bed scanning optical system shown in FIG. 5 includes a laser source 10, a polygon mirror 11 acting as a light deflector for deflecting a light beam B emitted from the laser source 10, an f-theta lens 12 for converging an incident light beam which impinges on the f-theta lens 12 at a constant angular velocity and exits the lens 12 to have a constant velocity on a scanning plane 14, and a reflecting mirror 13 for directing the light beam exiting the f-theta lens 12 toward the scanning plane 14. The scanning plane 14 corresponds to a surface of a photosensitive material placed on a flat table not shown. The light beam forms a beam spot which scans the scanning plane 14 in a main scanning direction with rotation of the polygon mirror 11, and moves relative to the scanning plane 14 in a sub-scanning direction perpendicular to the main scanning direction with movement of the flat table.

Figure 6:
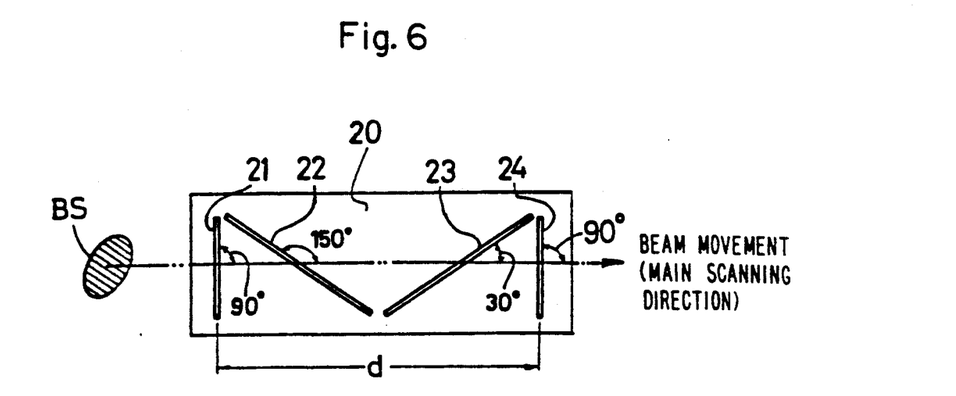
FIG. 6 is an explanatory view of an M-slit plate.

For detecting the shape of the beam spot on the scanning plane 14, this optical system includes an M-slit plate 20 disposed at a suitable location coplanar with the scanning plane 14. The M-slit plate 20 is made of a light-shielding material, and defines four slits 21–24 as shown in FIG. 6. The slits 21–23 are engaged to detection of the beam spot BS, and have different degrees of inclination, such as 90, 150 and 30 degrees, respectively, with respect to a direction of movement of the beam spot BS (i.e. the main scanning direction). The slits 21 and 24 which are used in detecting a moving velocity of the beam spot BS have the same inclination angle, and are spaced from each other a distance d of 1 mm, for example. Preferably, each slit has a width not exceeding 20% of a mean diameter of the beam spot BS. In practice, no problem will arise from slit widths up to about 50% of the mean diameter, but a width exceeding 60% thereof will result in an unacceptable error.

A light sensor such as a photo diode 25 is disposed under the M-slit plate 20 for detecting intensities of the light beam having passed through the slits 21-24. The photo diode 25 may comprise a single diode approximately the same size as the M-slit plate 20, or a combination of four photo diodes opposed to the respective slits 21-24.

Figure 7:
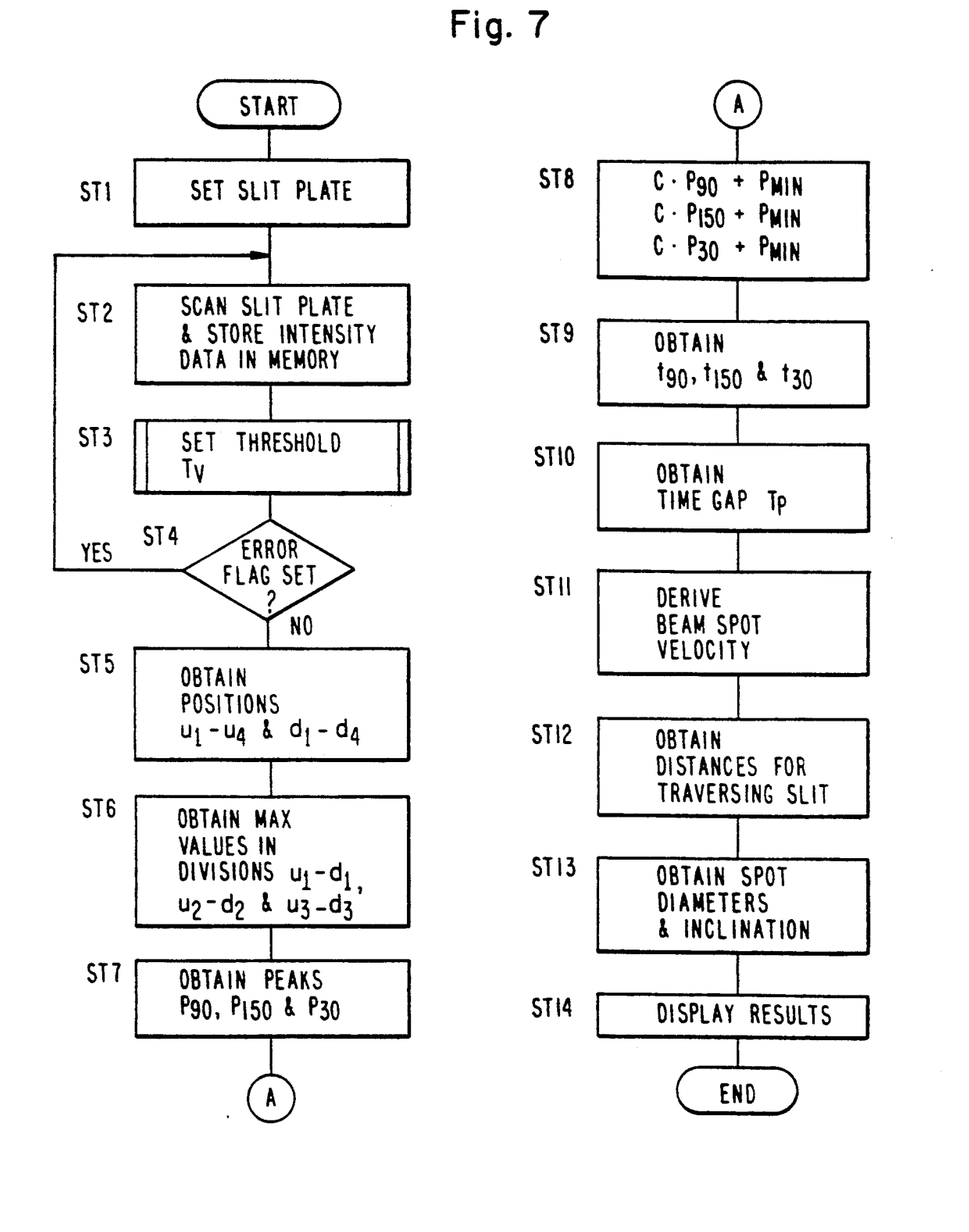
FIG. 7 is a flowchart of a beam spot shape detecting process in the first embodiment.
Figure 8:
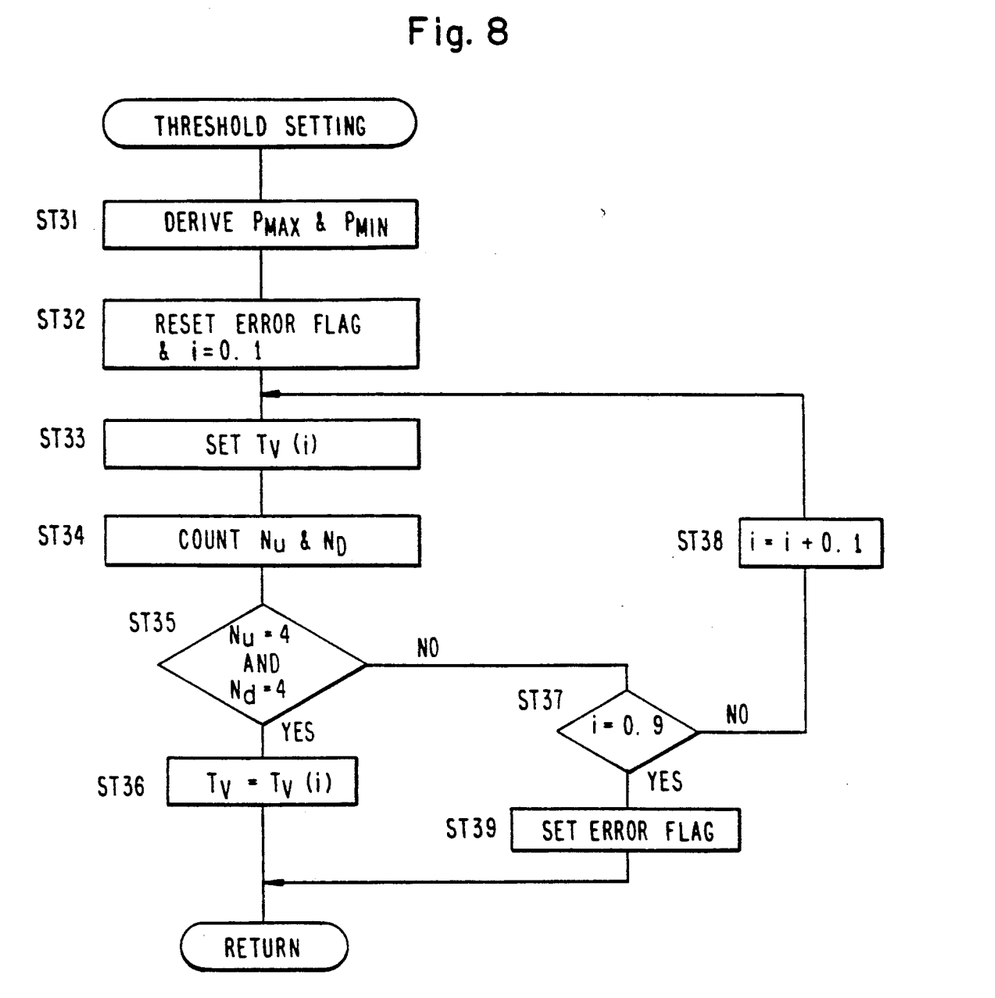
FIG. 8 is a flow chart of a threshold level setting process.

A beam shape detecting operation carried out with the foregoing apparatus will be described next with reference to the flowcharts shown in FIGS. 7 and 8.

Figure 9:
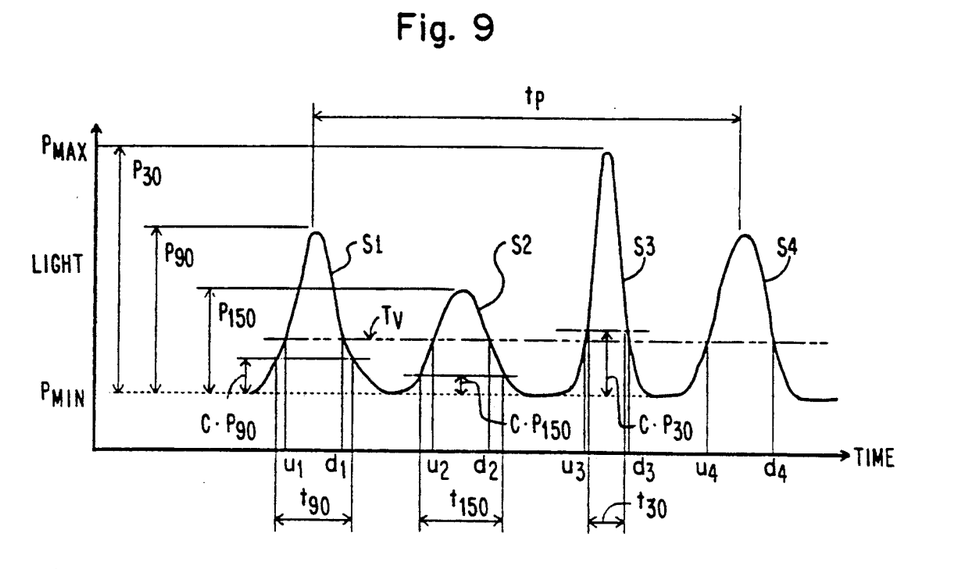
FIG. 9 is a view showing a waveform of light intensities detected through M-shaped slits.

First, the M-slit plate 20 is set to a scanning line on the scanning plane 14 (step ST1). Then the light beam is caused to scan the M-slit plate 20. When the light beam having an elliptic shape traverses the M-slit plate 20 as shown in FIG. 6, the photo diode 25 outputs a detection signal as shown in FIG. 9. Partial light intensity data S1-S4 in FIG. 9 represent intensities of the light beam passing through the slits 21-24, respectively.

The signal output from the photo diode 25 is amplified by an amplifier 26, digitalized by an analog-to-digital converter 27, and stored as light intensity data in a memory 28 (step ST2).

A CPU 29 reads the light intensity data from the memory 28, and sets a threshold level Tv for finding peak values in the intensity data (step ST3). A process for setting the threshold level will particularly be described now with reference to FIG. 8.

First, a maximum level Pmax and a minimum level Pmin as shown in FIG. 9 are derived from the light intensity data read from the memory 28 (step ST31). Then an error flag is reset, and "0.1" is set to coefficient i for setting a virtual threshold level (i) to be described hereunder (step ST32). Next, the virtual threshold level (i) is set as follows by using coefficient i (step ST33):

$$Tv(i) = i \cdot Pmax + (1-i) \cdot Pmin$$

The number of times Nu the light intensity data as shown in FIG. 9 upwardly crosses the virtual threshold level Tv(i) set at step ST33 and the number of times Nd the light intensity data downwardly crosses the virtual threshold level Tv(i) are counted at step ST34. Then, checking is made whether the counts Nu and Nd are both "4" or not (step ST35). Since, in this embodiment, the beam spot BS is detected through the four slits 21-24 as shown in FIG. 6, an appropriate threshold level may be said one that enables detection of four peaks in the light intensity data. If it is found at step ST35 that the counts Nu and Nd are both "4", the operation moves to step ST36 for setting the virtual threshold level Tv(i) as a valid threshold level Tv.

On the other hand, if one of the counts Nu and Nd is found to be a value other than "4", then this virtual threshold level Tv(i) is inappropriate and the operation moves to step ST37. Step ST37 is executed to determine whether the coefficient i is "0.9" or not. If the coefficient i is not "0.9", the operation moves to step ST38 at which "0.1" is added to the coefficient i to obtain a new coefficient i. Then, the operation returns to step ST33 for setting a new virtual threshold level Tv(i) by using the new coefficient i, which is followed by steps ST34 and ST35.

In this way, an appropriate threshold level Tv is determined by successively varying the coefficient i by stages of "0.1" from "0.1" to "0.9". If an appropriate threshold level is not found after increasing the coefficient to "0.9" (i.e. if there is no instance in which the counts Nu and Nd are both "4"), the operation moves from step ST37 to step ST39 for setting the error flag.

After completing the step ST36 or ST39, the operation moves to step ST4 for checking whether the error flag is set or not. If the error flag is set, it means that no appropriate threshold level has been found, that is the light intensity data obtained from the previous scan is itself inappropriate. Then the operation returns to step ST2 for causing the light beam to scan the M-slit plate 20 and obtain light intensity data again.

If step ST4 finds the error flag not set, the operation moves to step ST5. Step ST5 is executed to determine positions u1-u4 at which the light intensity data upwardly crosses the set threshold level Tv and positions d1-d4 at which the intensity data downwardly crosses the threshold level Tv.

At step ST6, maximum values of light intensity data are obtained for divisions u1-d1, u2-d2 and u3-d3, respectively.

Then, step ST7 is executed to determine peaks P90, P150 and P30 in these respective divisions by finding differences between the maximum values obtained at step ST6 and the offset value Pmin.

At step ST8, the peaks obtained at step ST7 are multiplied by a predetermined coefficient C, to which the offset value Pmin is added to obtain light intensity levels, as follows:

C·P90+Pmin

C·P150+Pmin

C·P30+Pmin

The coefficient C is one for determining beam spot diameters of a light beam having a normal distribution of light intensity, and is set to $1/e^2$ (e=2.71828 . . . ), for example.

Then, step ST9 is executed to determine periods of time t90, t150 and t30 during which the light intensity data exceeds the intensity levels obtained at step ST8. The periods of time t90, t150 and t30 thus obtained correspond to periods of time for the beam spot BS to traverse the slits 21, 22 and 23, respectively.

Next, step ST10 is executed to determine a time gap tp between the points of time at which the maximum values of the light intensity data occur in the divisions u1-d1 and u4-d4.

At step ST11, a moving velocity d/tp of the beam spot BS is derived from the time gap tp obtained at step ST10 and the known distance d between the slits 21 and 24.

At step ST12, distances 2T90, 2T150 and 2T30 that the beam spot BS has moved in traversing the respective slits 21-23 are obtained by multiplying the periods of time t90, t150 and t30 obtained at step ST9 by the moving velocity. The values of T90, T150 and T30 are derived from the following equations (1)-(3):

$$T90 = \frac{t90}{2} \cdot \frac{d}{tp} \qquad (1)$$

$$T150 = \frac{t150}{2} \cdot \frac{d}{tp} \qquad (2)$$

-continued $$T30 = \frac{t30}{2} \cdot \frac{d}{tp} \quad (3)$$

Figure 10:
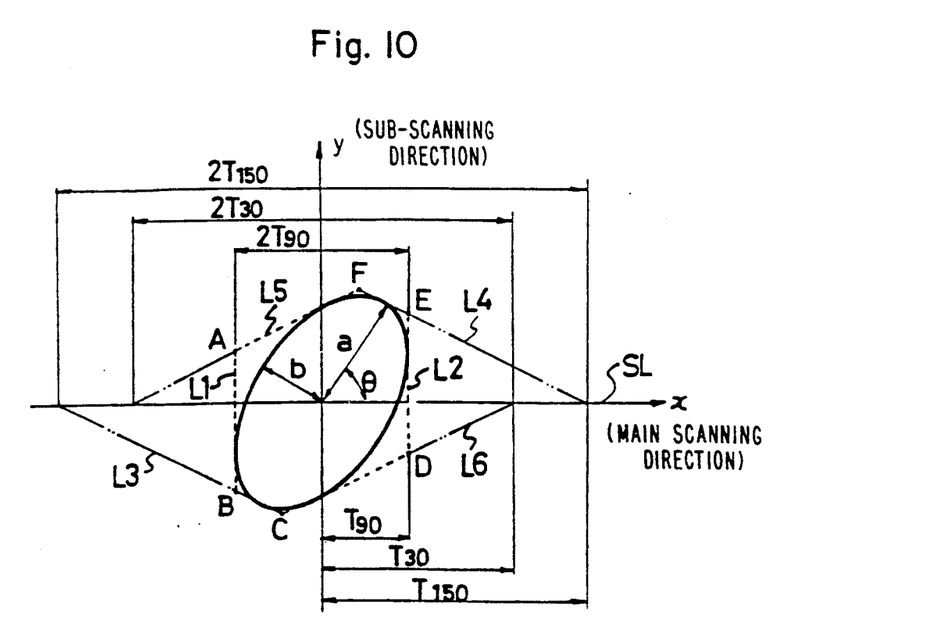
FIG. 10 is an explanatory view of beam spot shape detection.

The values of T90, T150 and T30 derived from the equations (1)–(3) are substituted into equations (4)–(6) set out hereunder, respectively, to obtain a first diameter 2a, a second diameter 2b and an angle $\theta$ (0° ≦ $\theta$ < 90°) between a scanning line SL and an axis a, with respect to the moving direction of the beam spot BS, of the elliptic beam spot BS as shown in FIG. 10 (step ST13). FIG. 10 shows a relationship between the elliptic shape and the distances of movement 2T90, 2T150 and 2T30. Six straight lines L1–L6 contact the ellipse, of which the opposed lines, i.e. the lines L1 and L2, lines L3 and L4, and lines L5 and L6, are parallel to each other, respectively. The lines L1 and L2 are inclined 90 degrees with respect to the scanning line SL, which correspond to the angle of inclination of the slit 21, and cross the scanning line SL at points spaced apart a distance corresponding to the moving distance 2T90. Similarly, the lines L3 and L4 are inclined 150 degrees with respect to the scanning line SL, which correspond to the angle of inclination of the slit 22, and cross the scanning line SL at points spaced apart a distance corresponding to the moving distance 2T150. The lines L5 and L6 are inclined 30 degrees with respect to the scanning line SL, which correspond to the angle of inclination of the slit 23, and cross the scanning line SL at points spaced apart a distance corresponding to the moving distance 2T30. The ellipse inscribes the hexagon ABCDEF formed by the straight lines L1–L6. Where the beam spot BS is inclined as shown in FIG. 3, the values 2a, 2b and $\theta$ in the equations (4)–(6) are the first diameter X, the second diameter Y, and the angle between the main scanning direction and a direction of the first diameter, respectively.

$$2a = [(1/3)(T^2 150 + T^2 30 + 4T^2 90) + (1/\sqrt{3}) \quad (4)$$
$$\times (T^2 150 - T^2 30)$$
$$\times \{(1 + \tan^2 2\theta)/\tan^2 2\theta\}^{\frac{1}{2}}]^{\frac{1}{2}}$$

$$2b = [(1/3)(T^2 150 + T^2 30 + 4T^2 90) - (1/\sqrt{3}) \quad (5)$$
$$\times (T^2 150 - T^2 30)$$
$$\times \{(1 + \tan^2 2\theta)/\tan^2 2\theta\}^{\frac{1}{2}}]^{\frac{1}{2}}$$

$$\theta = (1/2)\tan^{-1}\{\sqrt{3}\,(T^2 150 - T^2 30)/ \quad (6)$$
$$(8T^2 90 - T^2 150 - T^2 30)\}$$

However, if T30=T150, then $\theta$=0, 2a=2T90 and 2b=2{(T²30−T²90)/3}^½.

As shown in FIG. 10, there is only one ellipse that inscribes the hexagon ABCDEF having parallel opposite sides. Thus, the shape of the beam spot BS can be determined correctly from the above equations (4)–(6).

After the first diameter, the second diameter and the inclination of the beam spot BS are determined as above, the results are shown on a display 30 at step ST14.

With the optical system of the scanning optical system as shown in FIG. 5, the shape of the beam spot may vary with scanning positions. According to the described embodiment, however, the shape of the beam spot may be determined by setting the M-slit plate 20 and photo diode 25 to various positions on the scanning line of the light beam B.

The angles of inclination of the M-shaped slits 21–24 are not limited to the values employed in the foregoing embodiment but may be selected as appropriate.

Figures 11A, 11B:
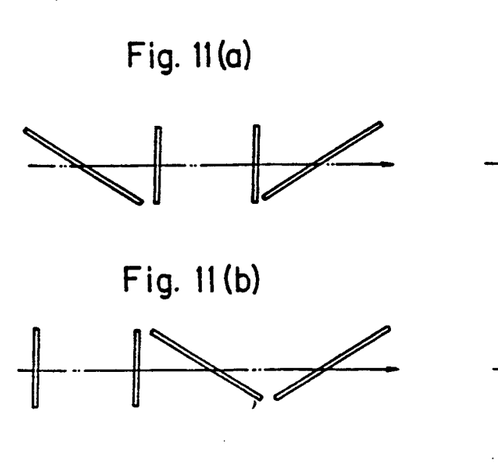
FIGS. 11(a) and 11(b) are explanatory views of modified slit arrangements, respectively.

Further, it is not absolutely necessary to arrange the slits 21–24 in the form of letter M. Instead, the slits may be arranged as shown in FIGS. 11 (a) and 11 (b), for example.

Second Embodiment

In the first embodiment, the light beam B and M-slit plate 20 are moved relative to each other by moving the light beam B and maintaining the M-slit plate 20 still. The shape of the beam spot may be detected also by maintaining the light beam B still and moving the M-slit plate 20.

Figure 12:
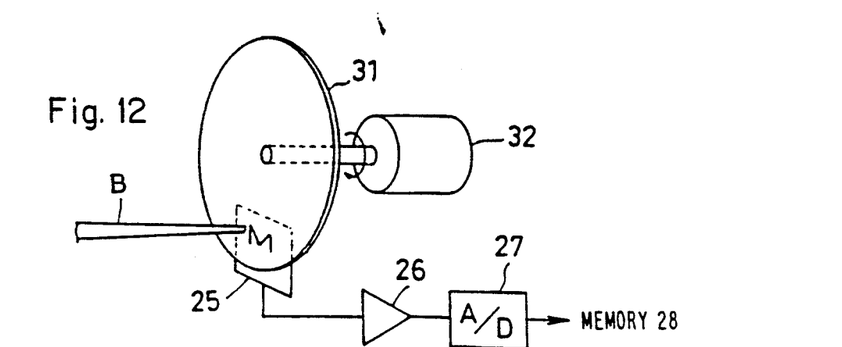
FIG. 12 is an explanatory view of a second embodiment.

As shown in FIG. 12, for example, a disk 31 defining M-shaped slits may be disposed at right angles to the light beam B and rotated by a motor 32. A photo diode 25 is disposed on the optical path of the light beam B rearwardly of the disk 31. This photo diode 25 detects intensities of the light beam having passed through the slits to determine the shape of the beam spot as in the first embodiment.

Figure 13:
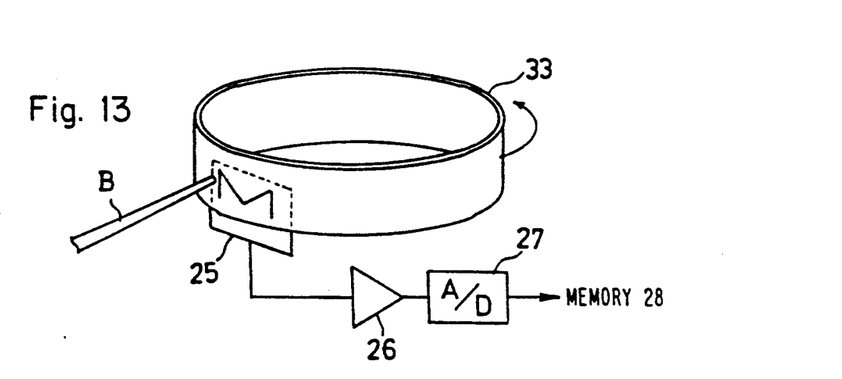
FIG. 13 is an explanatory view of a modification made to the second embodiment.

As shown in FIG. 13, a drum 33 defining M-shaped slits may be rotated, with a photo diode 25 disposed inwardly of the drum 33 for detecting intensities of the light beam having passed through the slits, thereby to determine the shape of the beam spot.

Where the M-shaped slits are used, the relative velocity between the light beam and slits is detected by means of the two slits 21 and 24 inclined 90 degrees. This eliminates the possibility of measuring precision being impaired by uneven rotation of the motor for driving the slits.

Third Embodiment

Figures 14A, 14B:
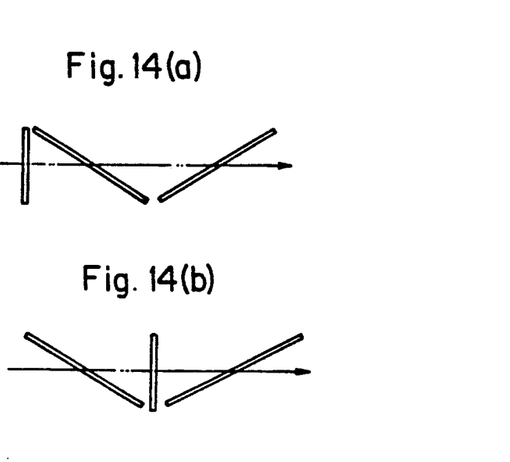
FIGS. 14(a) and 14(b) are explanatory views of slit arrangements in a third embodiment.

When, in the first and second embodiments, the relative moving velocity between the light beam and the M-slit plate 20 is not known beforehand, the relative velocity is derived from the light intensities detected through the two slits 21 and 24 inclined 90 degrees among the four slits 21–24 used. However, if the relative moving velocity between the light beam and slits is known, the shape of the beam spot may be detected by means of the three slits having different angles of inclination with respect to the moving direction of the beam spot as shown in FIGS. 14 (a) and 14 (b). It will be appreciated that the third embodiment does not require steps ST10 and ST11 in FIG. 7.

Fourth Embodiment

In the method using the slits as in the first to third embodiments, the light intensity detection signal has rise and fall timings influenced by the width of the slits. It is therefore necessary to make correction based on the slit width in order to detect the beam spot shape with high precision. Where the slits have a large width, the intensity detection signal will contain increased noise components due to disturbing ambient light. Conversely, if the slit width is too small, only small quantities of light will pass through the slits, resulting in reduced levels of the intensity detection signal to be vulnerable to internal noise of the light sensor. Thus, in either case, the measuring precision will be lowered.

This embodiment detects the shape of the light beam by using knife edges defining linear boundaries between a region for shielding the light beam and regions for transmitting the beam.

Figure 15:
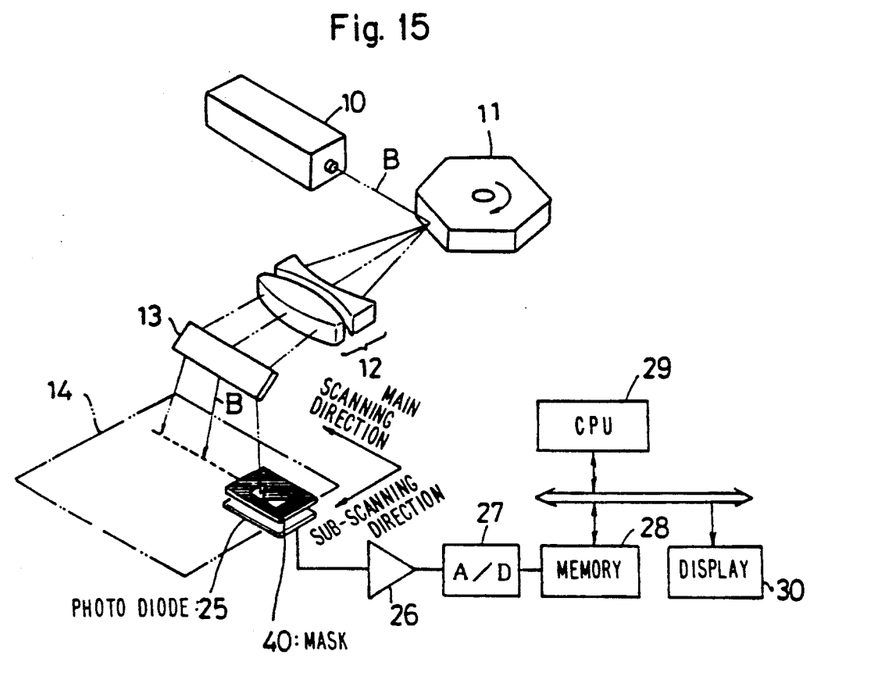
FIG. 15 is a block diagram illustrating an outline of a fourth embodiment.

FIG. 15 is a block diagram illustrating an outline of a flat-bed scanning optical system using a mask having knife edges arranged in a shape of letter M for detecting the shape of a light beam as in the first embodiment. Like components are affixed with like numerals with respect to the first embodiment shown in FIG. 5 and their description will not be repeated.

Figures 16A, 16B:
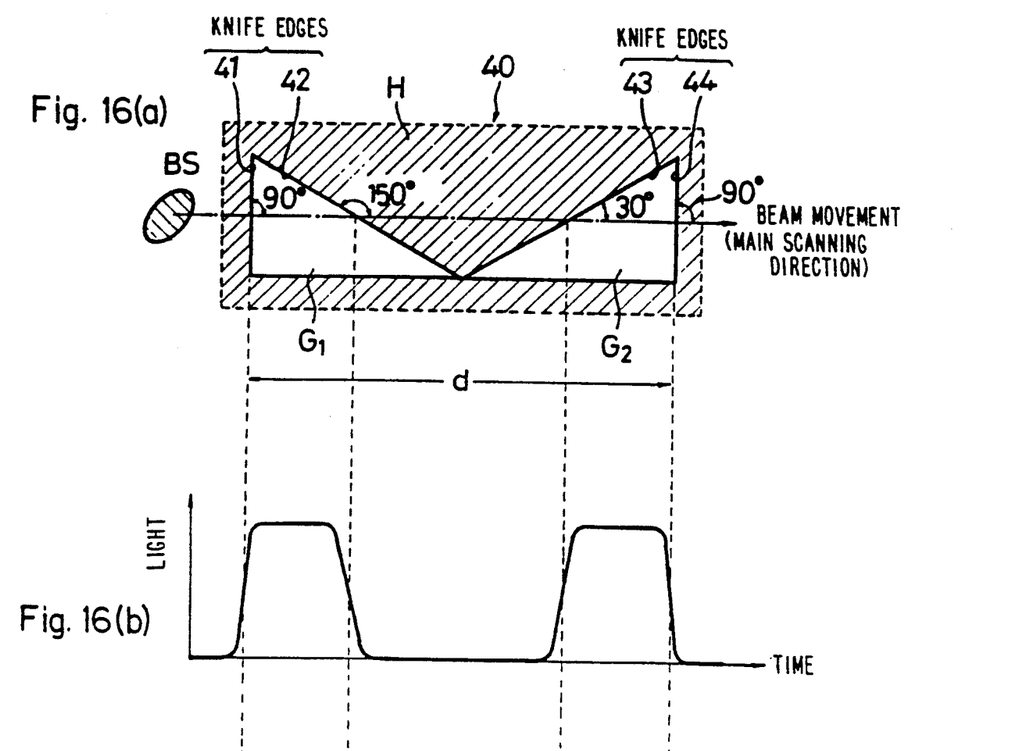
FIG. 16(a) is an explanatory view of a mask having knife edges arranged in a shape of letter M.
FIG. 16(b) is a view showing a waveform of light intensities detected by using the knife edges.

As shown in FIG. 16(a), a mask 40 includes two triangular light transmitting regions G1 and G2 within a light shielding region H. The light transmitting regions G1 and G2 have vertical and inclined edges defining knife edges 41–44 arranged in a shape of letter M. The knife edges 41–43 are engaged in detection of the beam spot BS, and have different degrees of inclination, such as 90, 150 and 30 degrees, respectively, with respect to a direction of movement of the beam spot BS (i.e. a main scanning direction). The knife edges 41 and 44 which are used in detecting a moving velocity of the beam spot BS have the same inclination angle, and are spaced from each other a distance d of 1mm, for example.

A beam shape detecting operation according to this embodiment will be described next with reference to the flowchart shown in FIG. 17.

Figure 17:
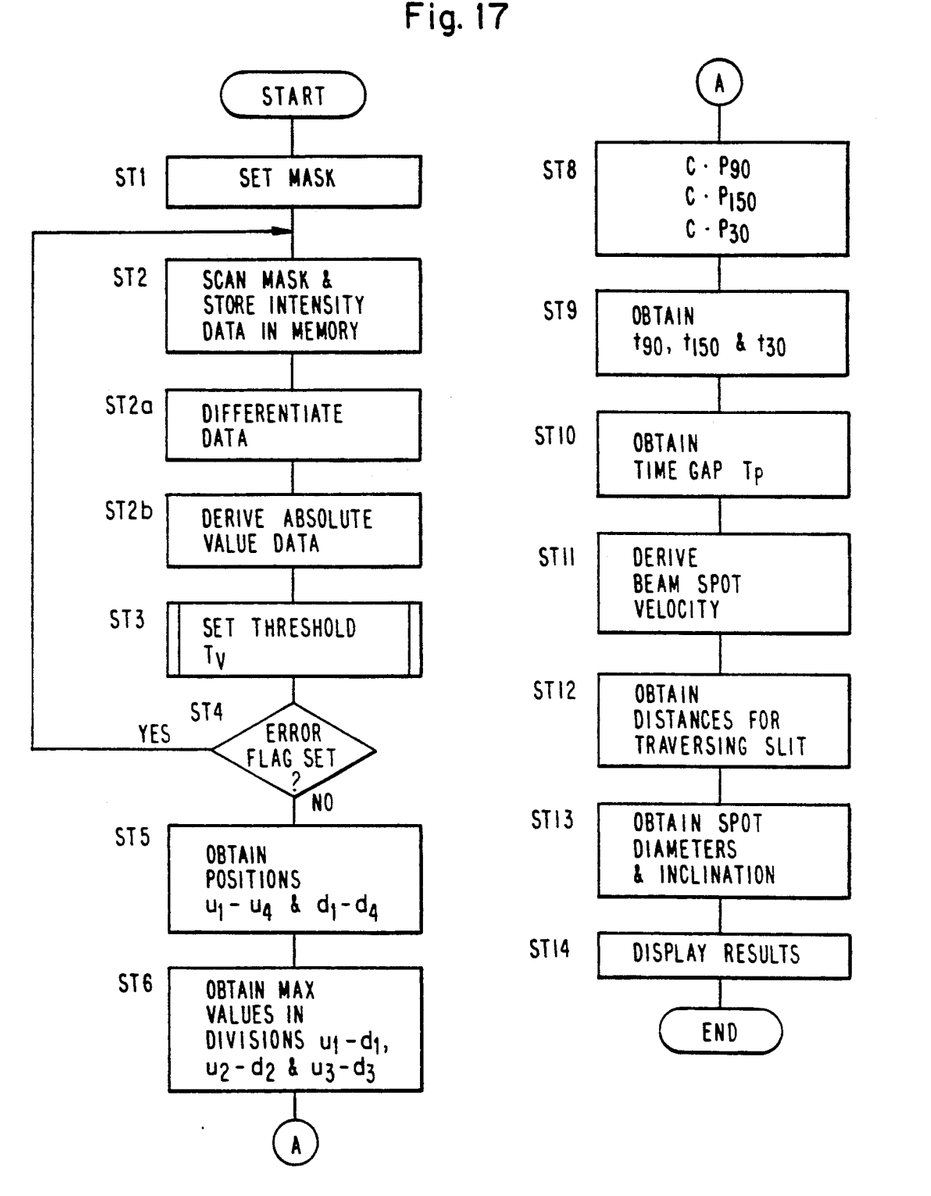
FIG. 17 is a flowchart of a beam spot shape detecting process in the fourth embodiment.

In FIG. 17, the steps affixed with like numerals with respect to FIG. 7 pertain to the same processes as in the first embodiment, and will be described only briefly here.

Figure 16C:
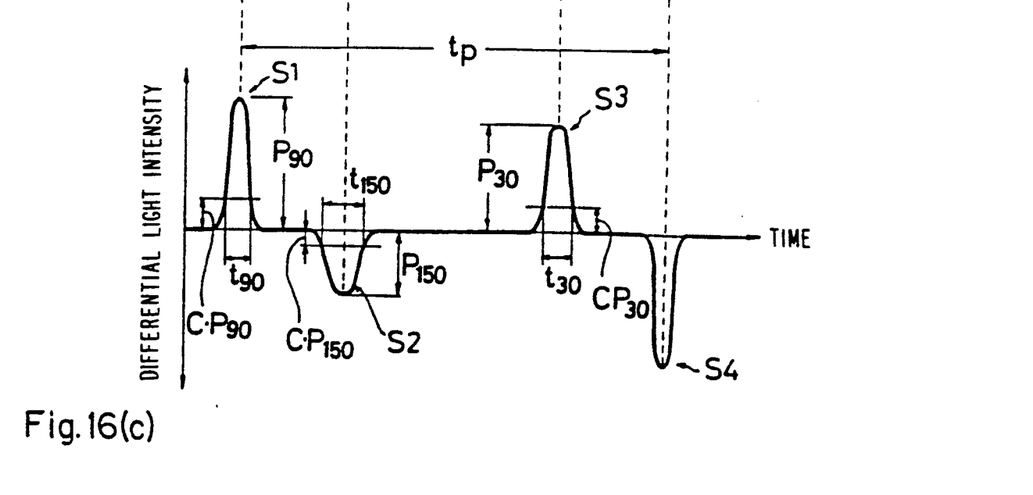
FIG. 16(c) is a view showing a differential waveform of a light intensity detection signal.
Figure 18:
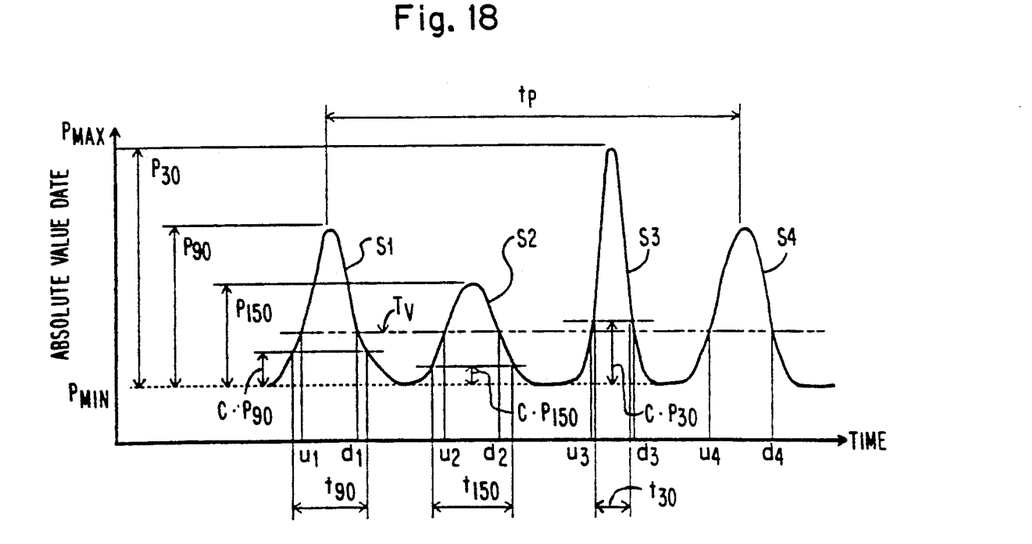
FIG. 18 is a view showing an absolute value waveform corresponding to the differential waveform shown in FIG. 16(c)

The mask 40 is set to a scanning line on the scanning plane 14 (step ST1). When the light beam having an elliptic shape traverses the mask 40 as shown in FIG. 16(a), the photo diode 25 outputs a light intensity detection signal as shown in FIG. 16(b). The detection signal output from the photo diode 25 is amplified by an amplifier 26, digitalized by an analog-to-digital converter 27, and stored as light intensity data in a memory 28 (step ST2). A CPU 29 reads the light intensity data from the memory 28, and differentiates the data to obtain differential light intensity values as shown in FIG. 16(c) (step ST2a). Further, the CPU 29 derives absolute value data from these differential light intensity values (step ST2b). The absolute value data derived is shown in FIG. 18. This absolute value data takes a form similar to that of the light intensity data according to the first embodiment described with reference to FIG. 9. In this embodiment, however, the minimum value Pmin is "0" since the data is differentiated at step ST2a. Thus, values corresponding to the peaks in the first embodiment may be derived from step ST6 in FIG. 17 for obtaining maximum values P90, P150 and P30 in the absolute value data for divisions u1–d1, u2–d2 and u3–d3, respectively. Thereafter, steps ST8 through ST14 are executed, as in the first embodiment, to process the maximum values P90, P150 and P30 obtained at step ST6, for determining the first diameter, the second diameter and the inclination of the beam spot BS.

The threshold setting process carried out using the absolute value data at step ST3 is the same as the process in the first embodiment, and is not described here.

Figure 19A:
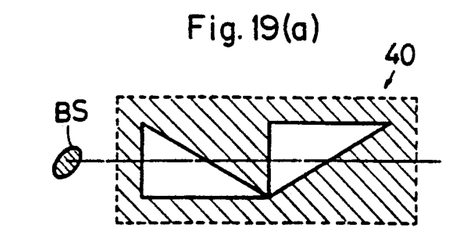
FIGS. 19(a) through 19(c) are explanatory views of modified knife edges, respectively.
Figure 19B:
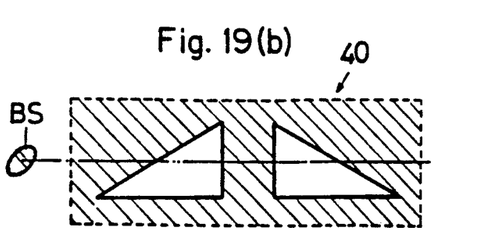
Figure 19C:
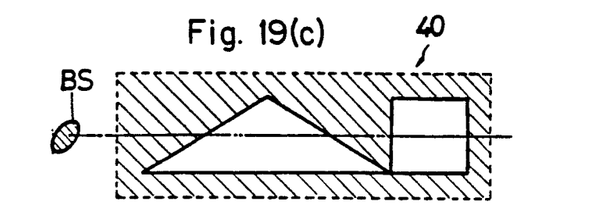

The angles of inclination of knife edges 41–44 are not limited to the values employed in the above embodiment but may be selected as appropriate. Further, it is not absolutely necessary to arrange the knife edges 41–44 in the form of letter M. Instead, the knife edges may be arranged as shown in FIGS. 19 (a) through 19 (c), for example. Further, a mask may be used in which the light transmitting regions G1 and G2 shown in FIGS. 16(a) and 9 are changed to light shielding regions and the surrounding region to the light transmitting region.

Fifth Embodiment

As in the second embodiment, the shape of the beam spot may be detected by maintaining the light beam B still and moving the mask 40.

Figure 20:
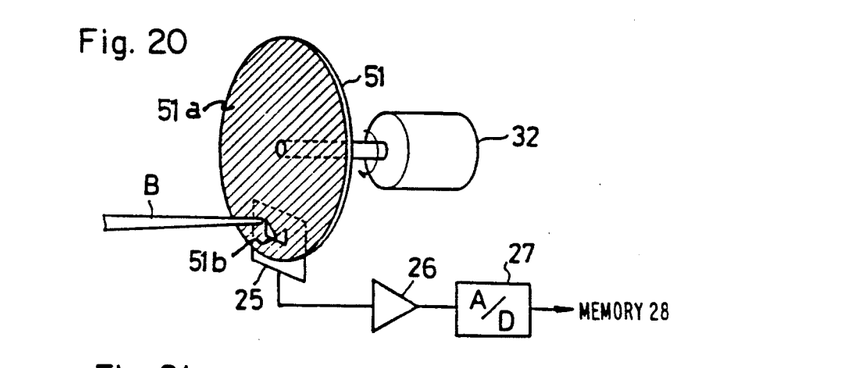
FIG. 20 is an explanatory view of a fifth embodiment.

As shown in FIG. 20, a disk 51 having a light shielding region 51a and a light transmitting region 51b defining M-shaped knife edges may be disposed at right angles to the light beam B and rotated by a motor 32. A photo diode 25 is disposed on the optical path of the light beam B rearwardly of the disk 51. This photo diode 25 detects intensities of the light beam having passed the knife edges to determine the shape of the beam spot as in the fourth embodiment.

Figure 21:
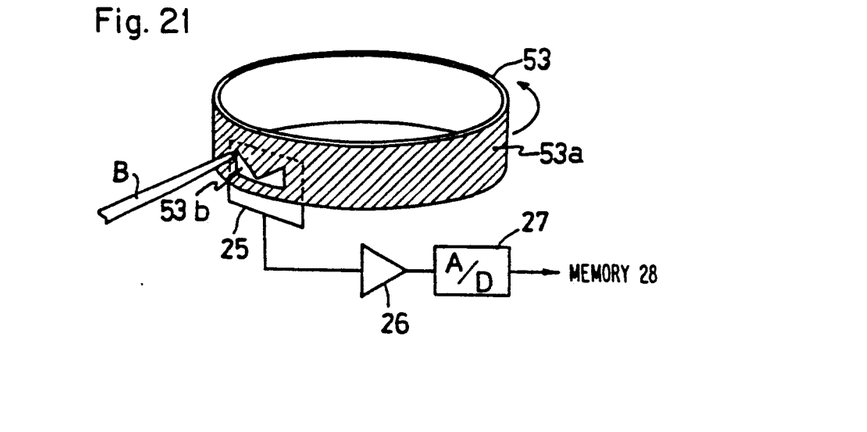
FIG. 21 is an explanatory view of a sixth embodiment.

As shown in FIG. 21, a drum 53 having a light shielding region 53a and a light transmitting region 53b defining M-shaped knife edges may be rotated, with a photo diode 25 disposed inwardly of the drum 53 for detecting intensities of the light beam having passed the knife edges, thereby to determine the shape of the beam spot.

Where the M-shaped knife edges are used, the relative velocity between the light beam and knife edges is detected by means of the two knife edges 41 and 44 inclined 90 degrees. This eliminates the possibility of measuring precision being impaired by uneven rotation of the motor for driving the disk.

Sixth Embodiment

When, in the fourth and fifth embodiments, the relative moving velocity between the light beam B and mask 40 is not known beforehand, the relative velocity is derived from the light intensities detected through the two knife edges 41 and 44 inclined 90 degrees among the four knife edges 41–44 used. However, if the relative moving velocity between the light beam and knife edges is known, the above four knife edges need not be used to detect the shape of the beam spot. In this case, the beam spot shape may be detected by means of three knife edges 41–43 having different angles of inclination with respect to the moving direction of the beam spot.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method of detecting a beam spot shape on a scanning plane of a scanning light beam in a scanning optical system having a constant scanning speed, said method comprising the steps of:
    (a) preparing three slits surrounded by a light shielding region on said scanning plane, said slits having different angles of inclination with respect to a scanning direction;
    (b) scanning said three slits with said scanning light beam to obtain light intensity data of said scanning light beam passing through said slits, said light intensity data representing light intensity values sampled at predetermined intervals;

(c) obtaining, from said light intensity data, a period of movement required for said scanning light beam to traverse each of said slits;

(d) obtaining, from said scanning speed and said period of movement, a distance of movement required for said scanning light beam to traverse each of said slits; and (e) obtaining said beam spot shape from said angles of inclination of said slits and said distance of movement.

2. The method as recited in claim 1, wherein the step (e) comprises the steps of:

obtaining three points on a virtual line, each point being displaced a half of said distance of movement from a reference position;

obtaining three straight lines extending through said points and having the same angles of inclination as those of said slits with which said straight lines are associated, respectively;

obtaining three further straight lines in point symmetry with said straight lines about said reference position, respectively; and obtaining an ellipse contacting all of the six straight lines and determining said ellipse to be said beam spot shape.

3. The method as recited in claim 2, wherein the step (c) comprises the steps of:

obtaining peak values in partial light intensity data corresponding to the respective slits;

multiplying each of said peak values by a selected coefficient to obtain light intensity levels, said light intensity levels pertaining to beam spot diameters of said light beam; and comparing said light intensity levels and said partial light intensity data corresponding thereto to obtain time spans during which said partial light intensity data exceed said light intensity levels, thereby to determine said time spans to be said periods of movement.

4. The method as recited in claim 3, further comprising the steps of:

(f) preparing a first and a second reference slits on said scanning plane, said first and second reference slits having substantially the same angle of inclination with respect to said scanning direction and having a predetermined space therebetween;

(g) scanning said first and second reference slits with said scanning light beam to obtain auxiliary light intensity data of said scanning light beam passing through said reference slits, said auxiliary light intensity data representing light intensity values sampled at predetermined intervals; and (h) obtaining said scanning speed from said auxiliary light intensity data and said space between said reference slits.

5. The method as recited in claim 4, wherein the step (h) comprises the steps of:

obtaining peak values in partial auxiliary light intensity data corresponding to the respective reference slits;

obtaining a time span between said peak values; and dividing said space between said reference slits by said time span to determine said scanning speed.

6. The method as recited in claim 5, wherein said first reference slit acts also as one of said three slits.

7. An apparatus for detecting a beam spot shape on a scanning plane of a scanning light beam in a scanning optical system having a constant scanning speed, said apparatus comprising:

(a) a slit member placed on said scanning plane and defining three slits surrounded by a light shielding region, said slits having different angles of inclination with respect to a scanning direction;

(b) light intensity data forming means for forming light intensity data of said scanning light beam passing through said slits, said light intensity data representing light intensity values sampled at predetermined intervals;

(c) moving period computing means for obtaining, from said light intensity data, a period of movement required for said scanning light beam to traverse each of said slits;

(d) moving distance computing means for obtaining, from said scanning speed and said period of movement, a distance of movement required for said scanning light beam to traverse each of said slits;

(e) shape computing means for obtaining said beam spot shape from said angles of inclination of said slits and said distance of movement; and (f) shape output means for outputting said beam spot shape obtained.

8. The apparatus as recited in claim 7, wherein said slit member comprises a first and a second reference slits having substantially the same angle of inclination with respect to said scanning direction and having a predetermined space therebetween, said apparatus further comprising:

(g) auxiliary light intensity data forming means for forming auxiliary light intensity data of said scanning light beam passing through said first and second reference slits, said auxiliary light intensity data representing light intensity values sampled at predetermined intervals; and (h) scanning speed computing means for obtaining said scanning speed from said auxiliary light intensity data and said space between said reference slits.

9. The apparatus as recited in claim 8, wherein said first reference slit acts also as one of said three slits.

10. The apparatus as recited in claim 9, wherein the four slits formed in said slit member are arranged substantially in a shape of letter M.

11. A method of detecting a beam spot shape on a scanning plane of a scanning light beam in a scanning optical system having a constant scanning speed, said method comprising the steps of:

(a) preparing three knife edges linearly defined on said scanning plane by a region for shielding said light beam and a region for transmitting said light beam, said knife edges having different angles of inclination with respect to a scanning direction;

(b) scanning said three knife edges with said scanning light beam to obtain light intensity data of said scanning light beam passing through said knife edges, said light intensity data representing light intensity values sampled at predetermined intervals;

(c) differentiating said light intensity data to obtain light intensity differential data;

(d) obtaining, from said light intensity differential data, a period of movement required for said scanning light beam to traverse each of said knife edges;

(e) obtaining, from said scanning speed and said period of movement, a distance of movement required for said scanning light beam to traverse each of said knife edges; and (f) obtaining said beam spot shape from said angles of inclination of said knife edges and said distance of movement.

12. The method as recited in claim 11, wherein the step (f) comprises the steps of:

obtaining three points on a virtual line, each point being displaced a half of said distance of movement from a reference position;

obtaining three straight lines extending through said points and having the same angles of inclination as those of said knife edges with which said straight lines are associated, respectively;

obtaining three further straight lines in point symmetry with said straight lines about said reference position, respectively; and obtaining an ellipse contacting all of the six straight lines and determining said ellipse to be said beam spot shape.

13. The method as recited in claim 12, wherein the step (d) comprises the steps of:

obtaining peak values in absolute value data of partial light intensity differential data corresponding to the respective knife edges;

multiplying each of said peak values by a selected coefficient to obtain threshold levels, said threshold levels pertaining to beam spot diameters of said light beam; and comparing said threshold levels and said absolute value data corresponding thereto to obtain time spans during which said absolute value data exceed said threshold levels, thereby to determine said time spans to be said periods of movement.

14. The method as recited in claim 13, further comprising the steps of:

(g) preparing a first and a second reference knife edges on said scanning plane, said first and second reference knife edges having substantially the same angle of inclination with respect to said scanning direction and having a predetermined space therebetween;

(h) scanning said first and second reference knife edges with said scanning light beam to obtain auxiliary light intensity data of said scanning light beam passing through said reference knife edges, said auxiliary light intensity data representing light intensity values sampled at predetermined intervals;

(i) differentiating said auxiliary light intensity data to obtain auxiliary light intensity differential data;

(j) obtaining absolute value data of said auxiliary light intensity differential data; and (k) obtaining said scanning speed from said absolute value data of said auxiliary light intensity differential data and said space between said reference knife edges.

15. The method as recited in claim 14, wherein the step (k) comprises the steps of:

obtaining peak values in absolute value data in partial auxiliary light intensity data corresponding to the respective reference knife edges;

obtaining a time span between said peak values; and dividing said space between said reference knife edges by said time span to determine said scanning speed.

16. The method as recited in claim 15, wherein said first reference knife edge acts also as one of said three knife edges.

17. An apparatus for detecting a beam spot shape on a scanning plane of a scanning light beam in a scanning optical system having a constant scanning speed, said apparatus comprising:

(a) a mask member placed on said scanning plane and having a light shielding region and a light transmitting region defining three linear knife edges, said knife edges having different angles of inclination with respect to a scanning direction;

(b) light intensity data forming means for forming light intensity data of said scanning light beam passing through said knife edges, said light intensity data representing light intensity values sampled at predetermined intervals;

(c) light intensity differential data forming means for differentiating said light intensity data into light intensity differential data;

(d) moving period computing means for obtaining, from said light intensity differential data, a period of movement required for said scanning light beam to traverse each of said knife edges;

(e) moving distance computing means for obtaining, from said scanning speed and said period of movement, a distance of movement required for said scanning light beam to traverse each of said knife edges;

(f) shape computing means for obtaining said beam spot shape from said angles of inclination of said knife edges and said distance of movement; and (g) shape output means for outputting said beam spot shape obtained.

18. The apparatus as recited in claim 17, wherein said mask member comprises a first and a second reference knife edges having substantially the same angle of inclination with respect to said scanning direction and having a predetermined space therebetween, said apparatus further comprising:

(h) auxiliary light intensity data forming means for forming auxiliary light intensity data of said scanning light beam passing through said first an second reference knife edges, said auxiliary light intensity data representing light intensity values sampled at predetermined intervals;

(i) auxiliary light intensity differential data forming means for differentiating said auxiliary light intensity data into auxiliary light intensity differential data; and (j) scanning speed computing means for obtaining said scanning speed from said auxiliary light intensity differential data and said space between said reference knife edges.

19. The apparatus as recited in claim 18, wherein said first reference knife edge acts also as one or said three knife edges.

20. The apparatus as recited in claim 19, wherein the four knife edges formed in said mask member are arranged substantially in a shape of letter M.

* * * * *